United States Patent
Butterstein et al.

(10) Patent No.: US 11,630,814 B2
(45) Date of Patent: Apr. 18, 2023

(54) AUTOMATED ONLINE UPGRADE OF DATABASE REPLICATION

(71) Applicant: International Business Machines Corporation, Armonk, NY (US)

(72) Inventors: Dennis Butterstein, Stuttgart (DE); Felix Beier, Haigerloch (DE); Einar Lueck, Filderstadt (DE); Sabine Perathoner-Tschaffler, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 17/117,272

(22) Filed: Dec. 10, 2020

(65) Prior Publication Data

US 2022/0188278 A1    Jun. 16, 2022

(51) Int. Cl.
*G06F 16/21* (2019.01)
*G06F 16/22* (2019.01)
*G06F 11/32* (2006.01)
*G06F 16/27* (2019.01)
*G06F 11/07* (2006.01)
*G06F 16/2457* (2019.01)

(52) U.S. Cl.
CPC ........ *G06F 16/214* (2019.01); *G06F 11/0772* (2013.01); *G06F 11/327* (2013.01); *G06F 16/2282* (2019.01); *G06F 16/24573* (2019.01); *G06F 16/27* (2019.01)

(58) Field of Classification Search
CPC .................................................... G06F 16/214
USPC ........................................................ 707/609
See application file for complete search history.

(56) References Cited

U.S. PATENT DOCUMENTS

| | | | |
|---|---|---|---|
| 9,639,592 B1 | 5/2017 | Natanzon | |
| 10,303,701 B1 | 5/2019 | Jang | |
| 10,474,695 B1 | 11/2019 | Holenstein | |
| 2005/0015436 A1* | 1/2005 | Singh | G06F 16/27 707/999.01 |
| 2009/0119351 A1* | 5/2009 | Edlund | G06F 16/217 |
| 2010/0191884 A1* | 7/2010 | Holenstein | G06F 11/2094 707/613 |
| 2013/0159249 A1* | 6/2013 | Dewall | G06F 16/2379 707/610 |
| 2017/0322993 A1* | 11/2017 | Brodt | G06F 16/2358 |
| 2018/0095842 A1* | 4/2018 | Kedia | G06F 11/1471 |
| 2020/0293509 A1* | 9/2020 | Lee | G06F 16/278 |
| 2021/0286824 A1* | 9/2021 | Qiao | G06F 16/27 |

FOREIGN PATENT DOCUMENTS

CN    104573056 A    4/2015

\* cited by examiner

*Primary Examiner* — Muluemebet Gurmu
(74) *Attorney, Agent, or Firm* — Joseph P. Curcuru (57) ABSTRACT

In an approach to improve online database replication by automating the upgrading of a database replications system online. Additionally, embodiments of the present invention stop an upgrade using a first incremental update strategy on data of a source database, identify an earliest open transaction from a first database to a second database, and identify a last committed log record identifier. Further, embodiments of the present invention execute an adaptive apply strategy on transactions including the earliest open transaction until the last committed log record identifier is reached by the adaptive apply strategy, and resume, by upgrade controller, the upgrade with a second incremental update strategy.

20 Claims, 4 Drawing Sheets

AUTOMATED ONLINE UPGRADE OF DATABASE REPLICATION

BACKGROUND OF THE INVENTION

The present invention relates generally to the field of online database replication, and more particularly to automated online database replication.

Database replication can be used on a plurality of database management systems (DBMS), usually with a primary-secondary relationship between the original and the copies. The primary DBMS logs the updates, which then ripple through to the secondary DBMS. The secondary DBMS outputs a message stating that it has received the update successfully, thus allowing the sending of subsequent updates. In multi-primary replication, updates can be submitted to any database node, and then ripple through to other servers. This is often desired but introduces substantially increased costs and complexity which may make it impractical in some situations. Database replication becomes more complex when it scales up horizontally and vertically. Horizontal scale-up has more data replicas, while vertical scale-up has data replicas located at greater physical distances. When data is replicated between database servers, so that the information remains consistent throughout the database system and users cannot tell or even know which server in the DBMS they are using, the system is said to exhibit replication transparency.

SUMMARY

Embodiments of the present invention disclose a method, a computer program product, and a system for automated upgrading of a database replications system online, the method comprising: stopping an upgrade using a first incremental update strategy on data of a source database; identifying an earliest open transaction from a first database to a second database; identifying a last committed log record identifier; executing an adaptive apply strategy on transactions including the earliest open transaction until the last committed log record identifier is reached by the adaptive apply strategy; and resuming, by upgrade controller, the upgrade with a second incremental update strategy.

DETAILED DESCRIPTION

Earliest open transaction specifies the transaction in the staging space that was opened first. Sometimes, a transaction (TXN) might be open for days or even weeks which makes it difficult to restart replication when an issue occurs. Embodiments of the present invention recognize that replication typically restarts from the earliest open TXN and if the earliest open TXN is old, then the log is re-read from the earliest open TXN. Embodiments of the present invention recognize that this typically means that the recovery log has already been archived to slow storage (e.g. tape) and thus should be avoided. Embodiments of the present invention recognize that Latest Applied Log Record (LALR) determines the last source log transaction that has been committed on the target database system.

Embodiments of the present invention recognize that the relation between the Earliest open TXN and Last Applied Log Record is that the Earliest open TXN and Last Applied Log Record defines a window in the recovery log. In various embodiments of the present invention, a plurality transactions executed before Earliest open TXN have already been applied to the target database. Embodiments of the present invention recognize that the transactions between Earliest open TXN and Last Applied Log Record might not complete in the given window, but it is possible that some of the transactions commit. As a result, there is no certainty that a plurality transactions in the Earliest open TXN and Last Applied Log Record window have been applied to the target (e.g. Tx4) database. Thus, when trying to start replication at the Earliest open TXN, embodiments of the present invention may identify and ignore transactions that have already been committed in a particular window, but pick up changes for transactions that have not been committed before the Latest Commit.

Embodiments of the present invention execute a staging space report. Embodiments of the present invention recognize that a change data capture (CDC) replication uses a staging space to be defined on the source system. The transaction data fetched from a relational database management system (RDBMS) database log is collected in the staging space until a transaction is either committed or rolled back and transmitted to the target system. The staging space report collects information (e.g., unit of recovery identifier (URID), time of the beginning of a transaction, current state of transaction, and tables included in the transaction) concerning the data present in the staging space while report is generated. Embodiments of the present invention recognize that the earliest open TXN can be identified by selecting the oldest time of the begin of a transaction from the report.

Embodiments of the present invention may execute adaptive apply processing (i.e., adaptive apply strategy), which is a technique, known in the art, to produce consistent data if parts of the data have already been replicated to the target database. In an analytics accelerator engine context, embodiments of the present invention recognize that adaptive apply strategy technique is employed to load tables to the target database while replication is done. Embodiments of the present invention utilize cursor stability (e.g., unload: share level change) as isolation level on the source database system which means, that changes are enabled on the source database while unloading the data for the load. For example, modifications might be caught by the unload process while modifications might be missed. To ensure consistent data, adaptive apply strategy conducts the following steps: (i) deletes a plurality of changes that have been replicated as inserts (e.g., update decomposition is executed and thus represent an update as a delete and a subsequent insert); (ii) deletes one or more changes that have been replicated as deletes; and (iii) inserts a plurality of changes that have been replicated as inserts.

Embodiments of the present invention recognize that analytics accelerator engines users use CDC-based replication to copy data from a source database system to a target database system. Embodiments of the present invention recognize that to set up replication, the user identifies and selects the tables in the system that will be replicated. Embodiments of the present invention recognize that to bring a table in for replication requires the user (e.g., a database administrator (DBA)) to conduct a the following sequence of steps: (i) add table to an analytics accelerator engine accelerator; (ii) load the source database system to the target database system initially, wherein this step might be both, time consuming and expensive for a company to perform; (iii) and execute replication.

Embodiments of the present invention integrate synchronization as a replication technology for an analytics accelerator engine making replication more efficient than CDC, thus improving the art of replication technology. For instance, embodiments recognize that in the art a user is required to repeat steps 1-3 of CDC-based replication, outlined above, for tables the user wants to use with Integrated Synchronization, which can be cumbersome and time consuming. To solve this particular problem, embodiments of the present invention substitute CDC replication through integrated synchronization on a per table basis eliminating the need to (i) stop replication; (ii) repeat steps 1-3 of CDC-based replication, outlined above, for a plurality replicated tables; and (iii) manually observe of the migration process. Thus, embodiments of the present invention, improve the art, at least by continuously executing replication, automatically identifying and selecting one or more tables to be added to the analytics accelerator engine accelerator, and automatically loading or pre-loading the source database system to the target database system initially. Embodiments of the present invention reduce costs based on the similar reasons stated above. Embodiments of the present invention are generally applicable for replication technologies relying on earliest open/latest commit patterns to record restart positions. Embodiments of the present invention improve the art by simplifying the adoption of new replication technologies for a customer and enabling a faster transition from older replication systems/technology to newer replication technologies.

It should be noted that the terms update and upgrade are interchangeable.

Implementation of embodiments of the invention may take a variety of forms, and exemplary implementation details are discussed subsequently with reference to the Figures (i.e., FIG. 1-FIG. 4).

Figure 1:
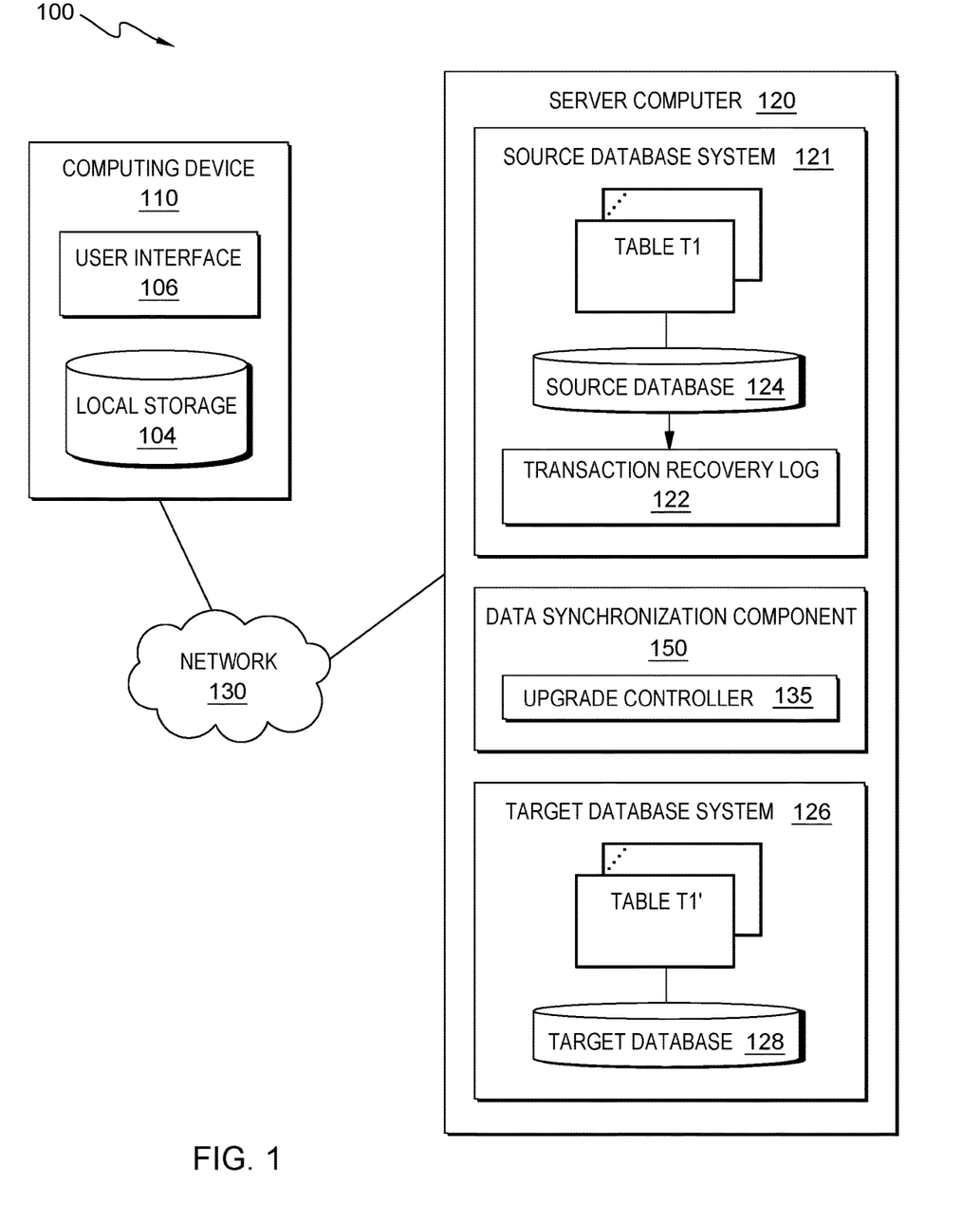
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 4.

User interface (interface) 106 provides an interface to the automated feedback and continuous learning component (component) 112. Computing device 110, via user interface 106, may enable a user and/or a client to interact with data synchronization component 150 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 4. In some embodiments server computer 120 may represent a plurality of server computers.

Each of source database system (source database) 124, target database system (target database) 128, and local storage 104 may be a data/knowledge repository and/or a database that may be written and/or read by one or a combination of data synchronization component 150, server computer 120 and computing device 110. In the depicted embodiment, source database 124 and target database 128 reside on server computer 120 and local storage 104 resides on computing device 110. In another embodiment, source database 124, target database 128, and/or local storage 104 may reside elsewhere within distributed data processing environment 100, provided that each may access and is accessible by computing device 110 and server computer 120. Source database 124, target database 128, and/or local storage 104 may each be implemented with any type of storage device capable of storing data and configuration files that may be accessed and utilized by server computer 120, such as, but not limited to, a database server, a hard disk drive, or a flash memory.

In some embodiments of the present invention, source database 124, target database 128, and/or local storage 104 may each be a hard drive, a memory card, a computer output to laser disc (cold storage), and/or any form of data storage known in the art. In some embodiments, source database 124, target database 128, and/or local storage 104 may each be one or more cloud storage systems and/or databases linked to a cloud network. In various embodiments, source database 124, target database 128, and/or local storage 104 may access, store, and/or house user data, physical room data, and meeting data, and/or data shared throughout distributed data processing environment 100.

In the depicted embodiment, source database system 121 and target database system 126 execute on server computer 120. In other embodiments, source database system 121 and target database system 126 may be executed on computing device 110. In various embodiments of the present invention, not depicted in FIG. 1, source database system 121 and target database system 126 may execute on a plurality of server computers 120 and/or on a plurality of computing devices 110. Source database system 121 and target database system 126 may each be a database management system (DBMS) that executes an underlying software component to create, read, update and delete (CRUD) data from a database, as it is understood in the art. In various embodiments of the present invention, source database system 121 and target database system 126 comprises an application programming interface (API), not depicted in FIG. 1.

In the depicted embodiment, source database system 121 comprises table T1, source database 124 and transaction recovery log 122. Transaction recovery log 122 is a history of actions executed by a database management system (e.g., source database system 121) used to guarantee atomicity, consistency, isolation, and durability (ACID) properties over crashes or hardware failures. Physically, transaction recovery log 122 is a file listing changes to the database, stored in a stable storage format. In the depicted embodiment, target database system 126 comprises table T1' and target database 128. Table T1 and table T1' are each one or more tables as they are understood in the art. In various embodiments of the present invention, table T1' is a complete replication of table T1.

In the depicted embodiment, data synchronization component 150 is executed on server computer 120. In other embodiments, data synchronization component 150 may be executed on computing device 110, source database system 121 and/or target database system 126. In various embodiments of the present invention, not depicted in FIG. 1, data synchronization component 150 may execute on a plurality of server computers 120 and/or on a plurality of computing devices 110. In some embodiments, data synchronization component 150 may be located and/or executed anywhere within distributed data processing environment 100 as long as data synchronization component 150 is connected to and/or communicates with source database 121, target database 128, computing device 110, and/or server computer 120, via network 130. In the depicted embodiment, data synchronization component 150 comprises upgrade controller 135.

In the depicted embodiment, upgrade controller 135 executes on data synchronization component 150. In the embodiments of the present invention, upgrade controller 135 may be executed on computing device 110, source database system 121 and/or target database system 126. In various embodiments of the present invention, not depicted in FIG. 1, upgrade controller 135 may execute on a plurality of server computers 120 and/or on a plurality of computing devices 110. In some embodiments, upgrade controller 135 may be located and/or executed anywhere within distributed data processing environment 100 as long as upgrade controller 135 is connected to and/or communicates with source database 121, target database 128, computing device 110, and/or server computer 120, via network 130.

Currently in the art migration from an existing replication technology (CDC) to a new technology (e.g., Integrated Synchronization) requires manual intervention by the user and a significant amount of processing costs for the reload of the replication enabled tables. Data synchronization component 150 solves this problem by enabling automatic migration of the replicated tables without user interaction and without a reload of the replication enabled tables. Data synchronization component 150 prevents the loss of data when switching from one replication technology to the other by applying changes from the tables to specific log positions from the existing replication technology and retrieving the changes from the log position by integrated synchronization.

In various embodiments of the present invention, data synchronization component 150 utilizes open transactions on the tables to ensure no data is lost, wherein the earliest open TXN is retrieved to identify open transactions on the tables (e.g., Table T1). In various embodiments of the present invention, once the consistency of a table is established, data synchronization component 150 queries the metadata of the existing replication technology to determine the table mappings (i.e. the table details). Data synchronization component 150 may use the metadata, received from the query of the existing replication technology, to establish table mappings in integrated synchronization for the integrated synchronization's own metadata.

In various embodiments of the present invention, the migration starts with tables, which are identified to be consistent or will be consistent. Data synchronization component 150 determines consistency of the tables by analyzing the open transactions on the replicated table. In various embodiments of the present invention, the tables that were postponed have a chance to catch up with the readied tables and be ready for migration once the first (e.g., readied) tables have migrated successfully.

In various embodiments of the present invention, upgrade controller 135 orchestrates and monitors the actual upgrade process. Therefore, upgrade controller 135 may exploit interfaces to the different incremental update strategies (i.e., Log-based Incremental Update Strategy 1 (incremental update strategy 1) and Log-based Incremental Update Strategy 2 (incremental update strategy 2)), see FIG. 2. In various embodiments of the present invention, the upgrade process executed by data synchronization component 150, via upgrade controller 135, comprises wherein the upgrade process: (i) synchronizes the meta data associated with the replication process and one or more replicated tables, and (ii) establishes synchronization of the hand over on a per table granularity in terms of in-flight transactions. In various embodiments of the present invention, the steps performed by data synchronization component 150, via upgrade controller 135, to execute the upgrade process are independent from the actual replication workload and system utilization. Data synchronization component 150 enables a technology upgrade or switch from an old replication technology (e.g., CDC) to a newer replication technology (integrated synchronization), wherein integrated synchronization is able to replicate data description language (ddl).

Figure 2:
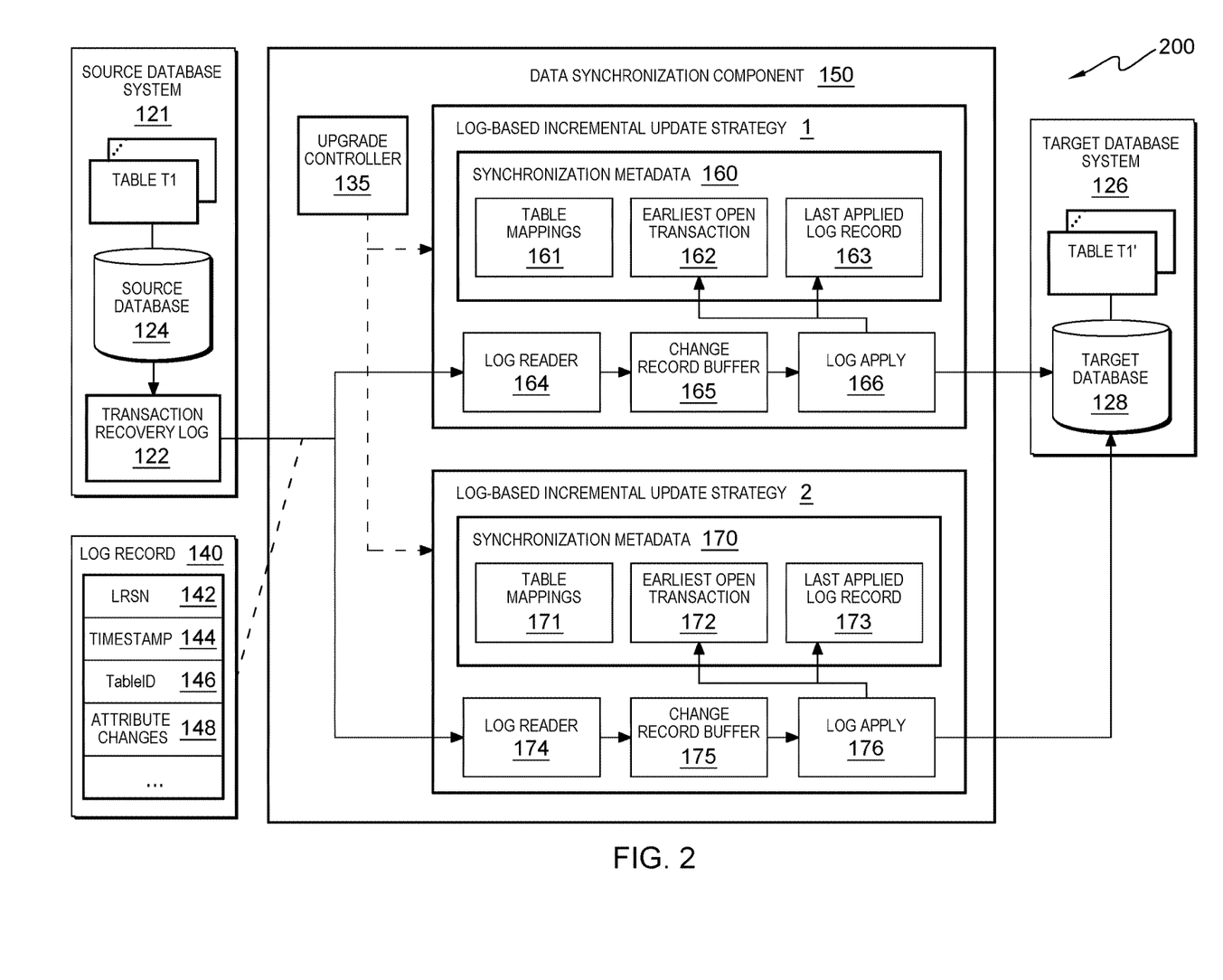
FIG. 2 illustrates a block diagram depicting a data synchronization component, executing on a server computer, within distributed data processing environment of FIG. 1, for upgrading of a database replications system online, in accordance with an embodiment of the present invention.

FIG. 2 illustrates a block diagram depicting data synchronization component 150 in communication with computing device 110 and/or server computer 120, within distributed data processing environment 100 of FIG. 1, for upgrading of a database replications system online, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims. In the embodiments described below, for FIG. 2, it is assumed that the upgrade is being performed from Incremental Update Strategy 1 to Incremental Update Strategy 2.

In the depicted embodiment, source database system 121 comprises table T1, source database 124 and transaction recovery log 122. In the depicted embodiment, data synchronization component 150 comprises: upgrade controller 135, incremental update strategy 1 and incremental update strategy 2. In the depicted embodiment, incremental update strategy 1 comprises: log reader 164, change record buffer 165, log apply 166, and synchronization metadata 160, wherein synchronization metadata 160 comprises table mappings 161, earliest open transaction 162, and last applied log record 163. In various embodiments, not depicted in FIG. 2, synchronization metadata 160 comprises other components known in the art.

In the depicted embodiment, incremental update strategy 2 comprises: log reader 174, change record buffer 175, log apply 176, and synchronization metadata 170, wherein synchronization metadata 170 comprises table mappings 171, earliest open transaction 172, and last applied log record 173. In various embodiments, not depicted in FIG. 2, synchronization metadata 160 comprises other components known in the art. In the depicted embodiment, target database system 126 comprises table T1' and target database 128.

In various embodiments, upgrade controller 135 can dictate which incremental update strategy data synchronization component 150 is taking (i.e., executing). In the depicted embodiment, data synchronization component 150 can instruct and/or retrieve transaction data from source database system 121, via transaction recovery log 122, wherein transaction recovery log 122 retrieves and/or receives transaction data from source database 124 and/or Table T1. In the depicted embodiment, data synchronization component 150, via log reader 164 or log reader 174, accesses and/or retrieves log record data (i.e., log record 140) from transaction recovery log 122. Log record 140 comprises: LRSN 142, timestamp 144, tableID 146, attribute changes 148, and/or other log record data known in the art. In various embodiments, transaction recovery log 122 is instructed to send transaction data to log reader 164 and/or log reader 174 by upgrade controller 135, wherein the transaction data comprises log record data. Log record data may denote data changes (like insert, updates, deletes) or denote transaction boundaries (like the start of a transaction and the end), wherein log record data containing data changes carries the information to which transaction the log record data is associated with. Log record data may describe transactions as well as data and ddl changes. In some embodiments of the present invention, log record data may be interchangeable with transaction data. In other embodiments, transactions without data changes are of no contribution for replicating changes.

In the depicted embodiment, during incremental update strategy 1, log reader 164 communicates and exchanges data with change record buffer 165. In the depicted embodiment, during incremental update strategy 1, change record buffer 165 communicates and exchanges data with log apply 166. In the depicted embodiment, log apply 166 communicates and exchanges with synchronization metadata 160, via data with earliest open transaction 162 and last applied log record 163. Additionally, in the depicted embodiment, log apply 166 communicates and exchanges data with target database 128, wherein target database 128 communicates and exchanges data with Table T1' on target database system 126.

In the depicted embodiment, during incremental update strategy 2, log reader 174 communicates and exchanges data with change record buffer 175. In the depicted embodiment, during incremental update strategy 2, change record buffer 175 communicates and exchanges data with log apply 176. In the depicted embodiment, log apply 176 communicates and exchanges with synchronization metadata 170, via data with earliest open transaction 172 and last applied log record 173. Additionally, in the depicted embodiment, log apply 176 communicates and exchanges data with target database 128, wherein target database 128 communicates and exchanges data with Table T1' on target database system 126. In the depicted embodiment, upgrade controller 135 switches data synchronization component 150 between incremental update strategy 1 and incremental update strategy 2.

In various embodiments of the present invention, data synchronization component 150 synchronizes replication metadata, wherein the synchronization of the replication metadata comprises the following steps. Upgrade controller 135 communicates with and notifies Incremental Update Strategy 2 of the metadata identified for replication. The metadata identified for replication, per replicated table comprises: table name and table schema name from source database system 121, table name and table schema name from target database system 126, column names & column data types from source database system 121, column names & column data types from target database system 126 (might differ from source database system 121), and source database system 121 and target database system 126 type dependent IDs and metadata (e.g., DB/OBID, and table schema version information). The metadata identified for replication, per source database comprises: credentials (e.g., authorization to access the source database).

In various embodiments of the present invention, data synchronization component 150 synchronizes the replication data of in-flight transactions, wherein the synchronization of the replication data of in-flight transactions comprises the steps described below. In various embodiments of the present invention, data synchronization component 150, via upgrade controller 135 synchronizes the in-flight transactions between Incremental Update Strategy 1 and Incremental Update Strategy 2 to the drain replication via Incremental Update Strategy 1 and to continue the replication via Incremental Update Strategy 2. For the actual coordination of the switch over, upgrade controller 135 monitors the following two parameters via the APIs, not depicted, of Incremental Update Strategy 1: (i) earliest open transaction 162 and (ii) last committed log record (i.e., last applied log record 163). For example, in CDC replication technology, the staging space report interface can be used to monitor the earliest open transaction 162 or the earliest open transaction 172. For the last committed log record the bookmark table interface may be used. In various embodiments, upgrade controller 135 distinguishes between the following two cases: (i) identifying there is no earliest open transaction (i.e., first case) and (ii) identifying there is an earliest open transaction (i.e., second case).

For the first case the actual switch over is straightforward. For example, upgrade controller 135 stops replication via Incremental Update Strategy 2, reads the last committed log record identifier (i.e., LRSN 152), determines that there is no open transaction again and then communicates LRSN 152 it to Incremental Update Strategy 2 to start replication based on that strategy.

For the second case, earliest open transaction 162, and LRSN 152 are both determined by the upgrade controller 135 after replication based on Incremental Update Strategy 1 has been stopped. Both data points (i.e., earliest open transaction 162, and LRSN 152) are communicated to Incremental Update Strategy 2 to trigger adaptive apply strategy starting with Earliest Open Transaction 172 until the last committed log record LRSN (i.e., last applied log record 173) is reached by Adaptive Apply. Afterwards, the Incremental Update Strategy 2 switches to normal apply and the actual transition is done. Adaptive apply strategy is executed because some transaction that have been started after Earliest Open Transaction and committed before the last committed log record will be applied twice which could lead to incorrect results without adaptive apply. Adaptive apply is a technique employed in the log apply step. In some embodiments of the present invention, instead of employing the standard application of insert and deletes, data synchronization component 150 executes an adaptive apply strategy that deletes the records to be inserted first from target database 128 to ensures duplicated data is not inserted onto target database 128.

Figure 3:
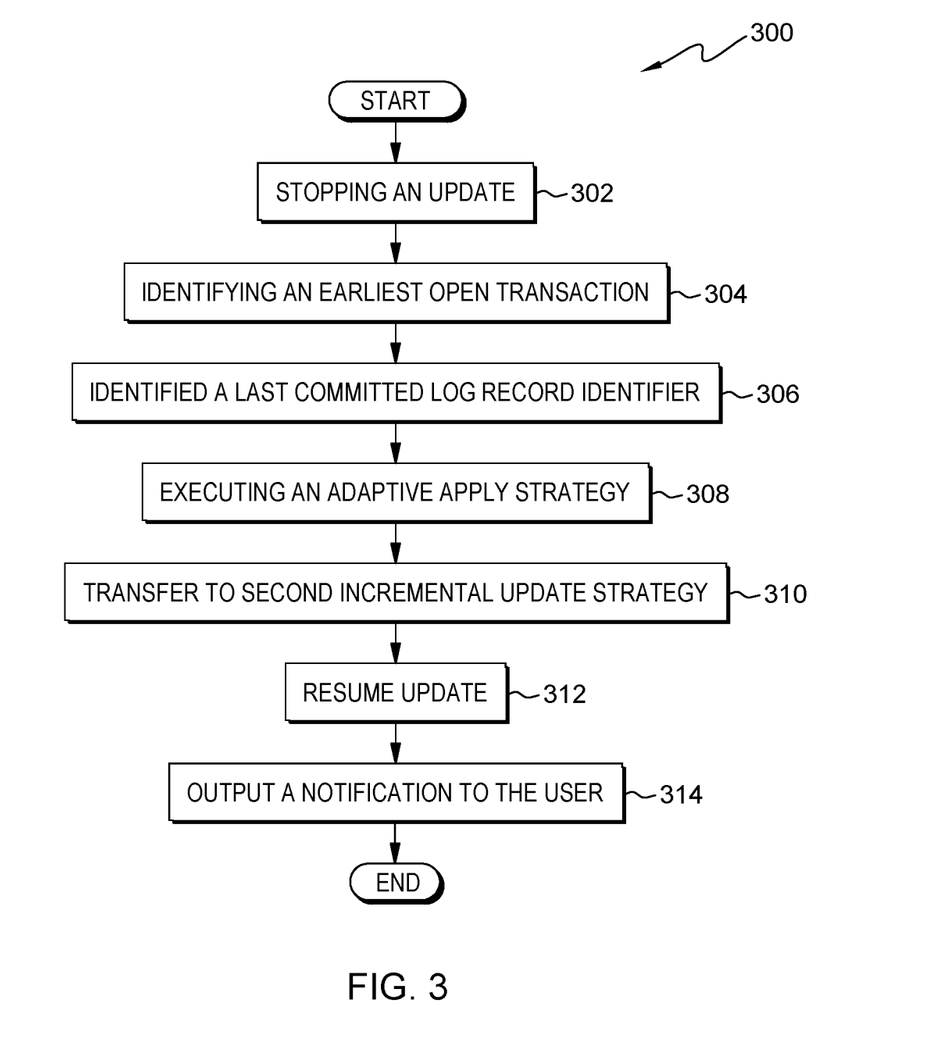
FIG. 3 illustrates operational steps of the data synchronization component, on a server computer within the distributed data processing environment of FIG. 1, for automated upgrading of a database replications system online, in accordance with an embodiment of the present invention.

FIG. 3 illustrates operational steps of data synchronization component 150, generally designated 300, in communication with computing device 110, within distributed data processing environment 100 of FIG. 1, for automated upgrading of a database replications system online, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, data synchronization component 150 stops the updating using the first incremental update strategy on the data of the source database. In various embodiments of the present invention, data synchronization component 150, via upgrade controller 135, stops the updating by using the first incremental update strategy on the data of the source database.

In step 304, data synchronization component 150 identifies the earliest open transaction. In various embodiments of the present invention, data synchronization component 150 identifies whether there is an earliest open transaction from the first database to the second database. In some embodiments, data synchronization component 150 determines whether there is an earliest open transaction from the first database to the second database.

In step 306, data synchronization component 150 identifies a last committed log record identifier. In various embodiments of the present invention, data synchronization component 150, via upgrade controller 135, identifies the last committed log record identifier by retrieving transaction data from transaction recovery log 122.

In step 308, data synchronization component 150 executes an adaptive apply strategy. In various embodiments of the present invention, data synchronization component 150, via upgrade controller 135, executes an adaptive apply strategy on incremental update strategy 1. In one particular embodiment of the present invention, data synchronization component 150, executes an apply strategy on the transactions including the earliest open transaction until the last committed log record identifier is reached by the apply strategy, wherein the apply strategy comprises deleting one or more changes that have been replicated as inserts, wherein the deleting of one or more changes that have been replicated as inserts includes deleting one or more actual inserts and actual updates. In this particular embodiment, since the updates comprise a deleted and a subsequent insert, deleting one or more changes that have been replicated as deletes, and subsequently inserting one or more changes that have been replicated as inserts.

In step 310, data synchronization component 150 transfers to second incremental update strategy (incremental update strategy 2). In various embodiments of the present invention, data synchronization component 150, via upgrade controller 135, proceeds with the second incremental update strategy by transferring the update replication to incremental update strategy 2.

In step 312, data synchronization component 150 resumes the update. In various embodiments of the present invention, data synchronization component 150, via upgrade controller 135, resumes the upgrade using incremental update strategy 2. Data synchronization component 150, via controller 135, may proceed with executing incremental update strategy 2. In various embodiments of the present invention, data synchronization component 150 adopts and executes a newer replication technology.

In step 314, data synchronization component 150 outputs a notification to a user. In various embodiments of the present invention, data synchronization component 150 outputs one or more notifications to computing device 110, via interface 106, to alert one or more users the upgrade and/or replication is complete or has failed, wherein the user interacts with the one or more notifications on computing device 110 through interface 106.

Figure 4:
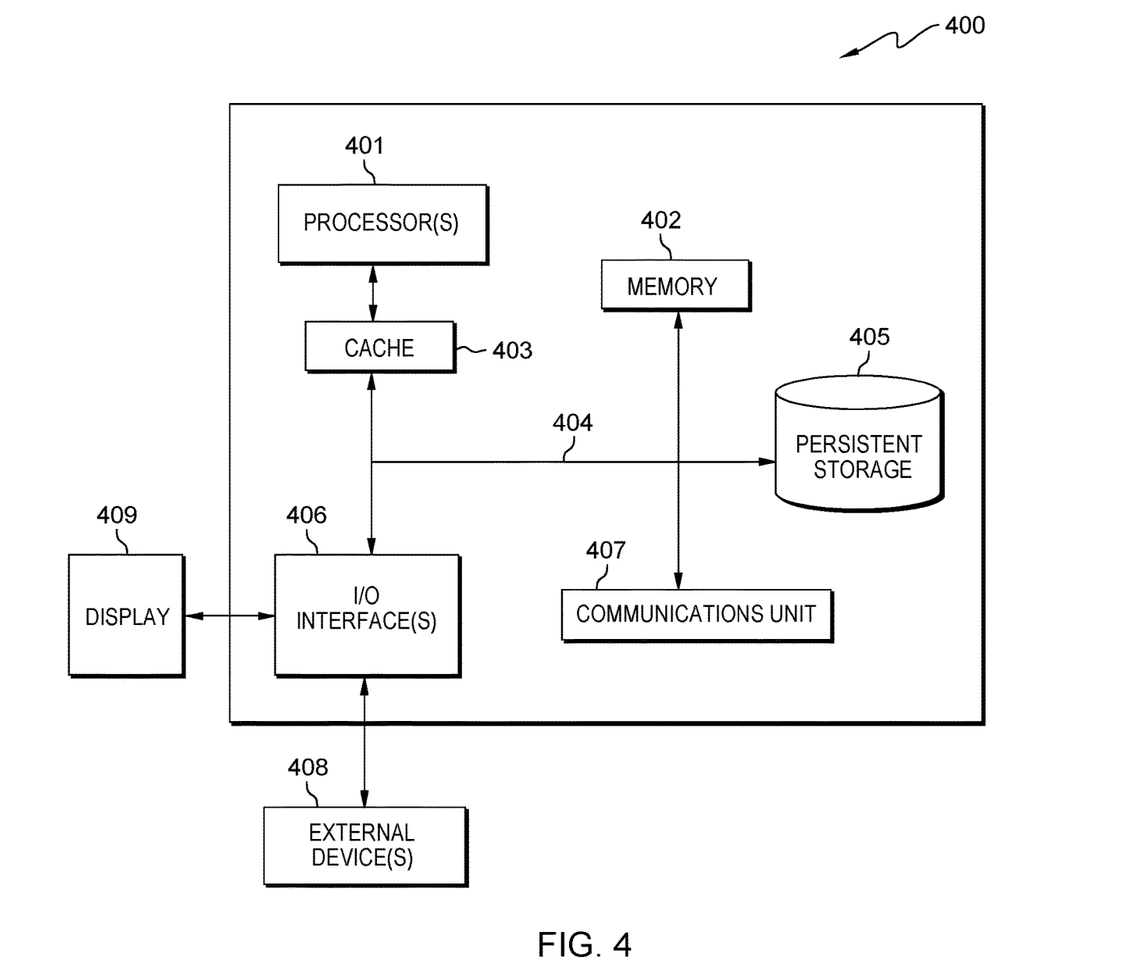
FIG. 4 depicts a block diagram of components of the server computer executing the data synchronization component within the distributed data processing environment of FIG. 1, in accordance with an embodiment of the present invention.

FIG. 4 depicts a block diagram of components of server computer 120 within distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 depicts computer system 400, where server computing 120 represents an example of computer system 400 that includes data synchronization component 150. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 may be implemented with any architecture designed for passing data and/or control information between processors (such as microprocessors, communications, and network processors, etc.), system memory, peripheral devices, and any other hardware components within a system. For example, communications fabric 404 may be implemented with one or more buses or a crossbar switch.

Memory 402 and persistent storage 405 are computer readable storage media. In this embodiment, memory 402 includes random access memory (RAM). In general, memory 402 may include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 may also include portable computer readable storage media such as, for example, thumb drives, portable optical or magnetic disks, and memory cards. Software and data used to practice embodiments of the present invention may be stored on such portable computer readable storage media and may be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for automated upgrading of a database replications system online, the method comprising:
    determining a consistency of one or more tables in a source database by analyzing one or more open transactions on a replicated table, wherein an earliest open transaction is retrieved to identify the one or more open transactions on the replicated table;
    responsive to determining a consistency within the one or more tables of the source database, stopping, by an upgrade controller, an upgrade using a first incremental update strategy on data of the source database, wherein the upgrade controller exploits interfaces based on various incremental update strategies;
    responsive to determining there is an earliest open transaction, identifying an earliest open transaction from the source database to a target database;
    identifying, by the upgrade controller, a last committed log record identifier;
    communicating the identified earliest open transaction and the identified last committed log record identifier to a second incremental update strategy, wherein the communication triggers an adaptive apply strategy;

executing the adaptive apply strategy on one or more transactions including the earliest open transaction until the last committed log record identifier is reached by the adaptive apply strategy; and resuming, by the upgrade controller, the upgrade with the second incremental update strategy.

2. The method of claim 1, wherein resuming the upgrade comprises:

transferring an update replication to the second incremental update strategy; and adopting and executing a newer replication technology.

3. The method of claim 1, further comprising:

outputting, to a computing device, a notification to alert a user that the upgrade or replication is either complete or has failed, wherein the user interacts with the notification through a user interface on the computing device.

4. The method of claim 1, wherein executing the adaptive apply strategy further comprises:

deleting one or more changes that have been replicated as inserts, wherein the deleting one or more changes that have been replicated as the inserts includes deleting one or more actual inserts and actual updates;

deleting one or more changes that have been replicated as deletes; and inserting one or more changes that have been replicated as inserts.

5. The method of claim 1, further comprising:

executing, by the upgrade controller, the upgrade, wherein the upgrade comprises:

synchronizing metadata associated with a replication process and one or more replicated tables; and establishing synchronization of a hand over on a per table granularity in terms of in-flight transactions.

6. The method of claim 1, further comprising:

querying metadata of an existing replication technology to determine table mappings, wherein the metadata is received from the query of the existing replication technology, and is used to establish table mappings in an integrated synchronization for metadata of the integrated synchronization, and wherein integrated synchronization is able to replicate data description language.

7. The method of claim 1, further comprising:

preventing a loss of data when switching from a first replication technology to a second replication technology, wherein the preventing the loss of data comprises:

applying changes from tables to one or more specific log positions from an existing replication technology; and retrieving the changes from the one or more log positions by integrated synchronization.

8. A computer program product for automated upgrading of a database replications system online, the computer program product comprising:

one or more computer readable storage media and program instructions stored on the one or more computer readable storage media, the stored program instructions comprising:

program instructions to determine a consistency of one or more tables in a source database by analyzing one or more open transactions on a replicated table, wherein an earliest open transaction is retrieved to identify the one or more open transactions on the replicated table;

responsive to determining a consistency within the one or more tables of the source database, program instruction to stop, by an upgrade controller, an upgrade using a first incremental update strategy on data of the source database, wherein the upgrade controller exploits interfaces based on various incremental update strategies;

program instruction to identify an earliest open transaction from the source database to a target database;

program instruction to identify, by the upgrade controller, a last committed log record identifier;

program instructions to communicate the identified earliest open transaction and the identified last committed log record identifier to a second incremental update strategy, wherein the communication triggers an adaptive apply strategy;

program instruction to execute the adaptive apply strategy on one or more transactions including the earliest open transaction until the last committed log record identifier is reached by the adaptive apply strategy; and program instruction to resume, by upgrade controller, the upgrade with the second incremental update strategy.

9. The computer program product of claim 8, wherein resuming the upgrade comprises:

program instruction to transfer an update replication to the second incremental update strategy; and program instruction to adopt and execute a newer replication technology.

10. The computer program product of claim 8, further comprising:

program instruction to output, to a computing device, a notification to alert a user that the upgrade or replication is either complete or has failed, wherein the user interacts with the notification through a user interface on the computing device.

11. The computer program product of claim 8, wherein executing the adaptive apply strategy further comprises:

program instruction to delete one or more changes that have been replicated as inserts, wherein the deleting one or more changes that have been replicated as the inserts includes deleting one or more actual inserts and actual updates;

program instruction to delete one or more changes that have been replicated as deletes; and program instruction to insert one or more changes that have been replicated as inserts.

12. The computer program product of claim 8, further comprising:

program instruction to execute, by the upgrade controller, the upgrade, wherein the upgrade comprises:

program instruction to synchronize metadata associated with a replication process and one or more replicated tables; and program instruction to establish synchronization of a hand over on a per table granularity in terms of in-flight transactions.

13. The computer program product of claim 8, further comprising:

program instruction to query metadata of an existing replication technology to determine table mappings, wherein the metadata is received from the query of the existing replication technology, and is used to establish table mappings in an integrated synchronization for metadata of the integrated synchronization, and wherein integrated synchronization is able to replicate data description language.

14. The computer program product of claim 8, further comprising:
   program instruction to prevent a loss of data when switching from a first replication technology to a second replication technology, wherein the preventing the loss of data comprises:
   program instruction to apply changes from tables to one or more specific log positions from an existing replication technology; and
      program instruction to retrieve the changes from the one or more log positions by integrated synchronization.

15. A computer system for automated upgrading of a database replications system online, the computer system comprising:
   one or more computer processors;
   one or more computer readable storage media;
   program instructions stored on the computer readable storage media for execution by at least one of the one or more computer processors, the stored program instructions comprising:
   program instructions to determine a consistency of one or more tables in a source database by analyzing one or more open transactions on a replicated table, wherein an earliest open transaction is retrieved to identify the one or more open transactions on the replicated table;
   responsive to determining a consistency within the one or more tables of the source database, program instruction to stop, by an upgrade controller, an upgrade using a first incremental update strategy on data of the source database, wherein the upgrade controller exploits interfaces based on various incremental update strategies;
   program instruction to identify an earliest open transaction from the source database to a target database;
   program instruction to identify, by the upgrade controller, a last committed log record identifier;
   program instructions to communicate the identified earliest open transaction and the identified last committed log record identifier to a second incremental update strategy, wherein the communication triggers an adaptive apply strategy;
   program instruction to execute the adaptive apply strategy on one or more transactions including the earliest open transaction until the last committed log record identifier is reached by the adaptive apply strategy; and
   program instruction to resume, by upgrade controller, the upgrade with the second incremental update strategy.

16. The computer system of claim 15, further comprising:
   program instruction to output, to a computing device, a notification to alert a user that the upgrade or replication is either complete or has failed, wherein the user interacts with the notification through a user interface on the computing device.

17. The computer system of claim 15, wherein executing the adaptive apply strategy further comprises:
   program instruction to delete one or more changes that have been replicated as inserts, wherein the deleting one or more changes that have been replicated as the inserts includes deleting one or more actual inserts and actual updates;
   program instruction to delete one or more changes that have been replicated as deletes; and
   program instruction to insert one or more changes that have been replicated as inserts.

18. The computer system of claim 15, further comprising:
   program instruction to execute, by the upgrade controller, the upgrade, wherein the upgrade comprises:
      program instruction to synchronize metadata associated with a replication process and one or more replicated tables; and
      program instruction to establish synchronization of a hand over on a per table granularity in terms of in-flight transactions.

19. The computer system of claim 15, further comprising:
   program instruction to query metadata of an existing replication technology to determine table mappings, wherein the metadata is received from the query of the existing replication technology, and is used to establish table mappings in an integrated synchronization for metadata of the integrated synchronization, and wherein integrated synchronization is able to replicate data description language.

20. The computer system of claim 15, further comprising:
   program instruction to prevent a loss of data when switching from a first replication technology to a second replication technology, wherein the preventing the loss of data comprises:
   program instruction to apply changes from tables to one or more specific log positions from an existing replication technology; and
   program instruction to retrieve the changes from the one or more log positions by integrated synchronization.

* * * * *